United States Patent [19]

Denissen et al.

[11] Patent Number: 5,644,582
[45] Date of Patent: Jul. 1, 1997

[54] CONVERSION ARRANGEMENT FOR A MAGNETIC RECORDING/REPRODUCING APPARATUS OF THE D-TYPE

[75] Inventors: Adrianus J. M. Denissen; Wilhelmus H. A. Bruls; Ludovicus M. G. M. Tolhuizen, all of Eidenhoven, Netherlands

[73] Assignee: U.S. Philips Corporation, New York, N.Y.

[21] Appl. No.: 393,750

[22] Filed: Feb. 24, 1995

[30] Foreign Application Priority Data

Mar. 9, 1994 [EP] European Pat. Off. .............. 94200594

[51] Int. Cl.$^6$ ........................ G11B 20/18; H03M 13/00; H03M 13/22
[52] U.S. Cl. ........................................ 371/37.4; 371/40.1
[58] Field of Search ...................... 371/37.4, 40.1, 371/37.5

[56] References Cited

U.S. PATENT DOCUMENTS 5,392,299  2/1995  Rhines et al. ........................ 371/37.5

OTHER PUBLICATIONS

Mallinson, J., "Achievements in Rotary Head Magnetic Recording", Proceedings of the IEEE, vol. 78, No. 6, pp. 1004–1016.

Yoneda, M., et al., "An Experimental VCR with New DCT Based Bit-Rate Reduction System", IEEE Transactions on Consumer Electronics, vol. 37, No. 3, pp. 275–282.

Kim, J., et al., "Record/Playback Interfaces: DSC–HDTV, HD–VCR and D3 VTR", IEEE Transactions on Consumer Electronics, vol. 39, No. 3, pp. 205–209.

*Primary Examiner*—Stephen M. Baker
*Attorney, Agent, or Firm*—Edward W. Goodman

[57] ABSTRACT

An encoder arrangement (28) for adapting a data signal for recording of the data signal on a D-type magnetic recording apparatus includes an error correction encoding unit (3), a converter unit (6) and a shuffling unit (9). A decoder arrangement (30) for reconverting the signal obtained after reproduction from a D-type reproduction apparatus includes comprises a deshuffling unit (14), an error correction decoding unit (17) and a reconverter unit (20).

28 Claims, 4 Drawing Sheets

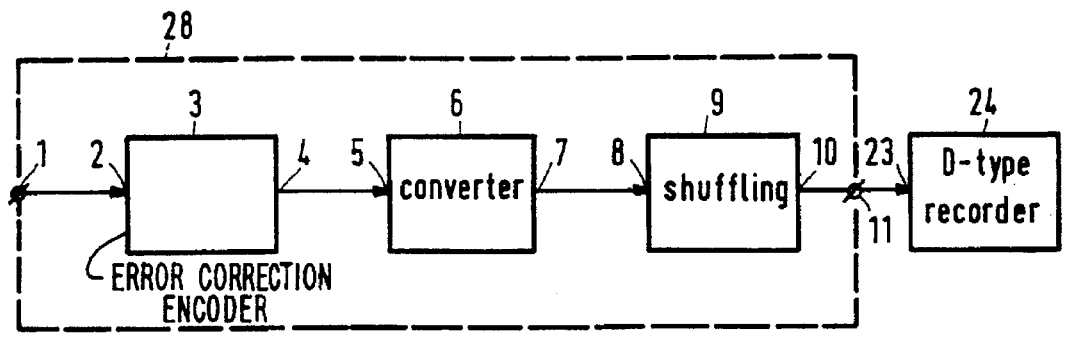
FIG.1A
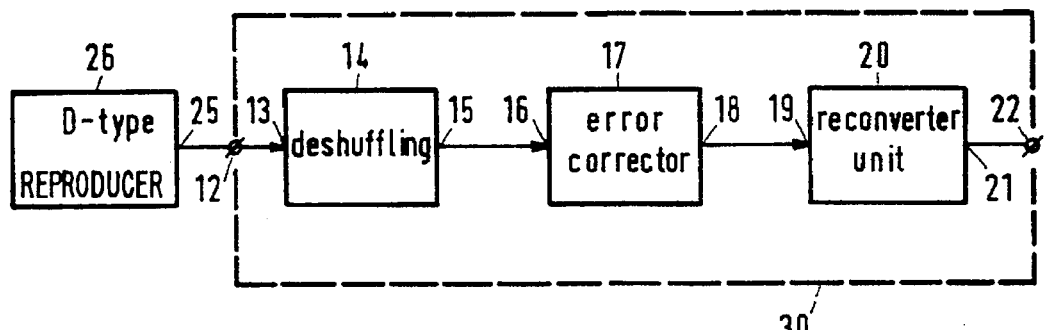
FIG.1B
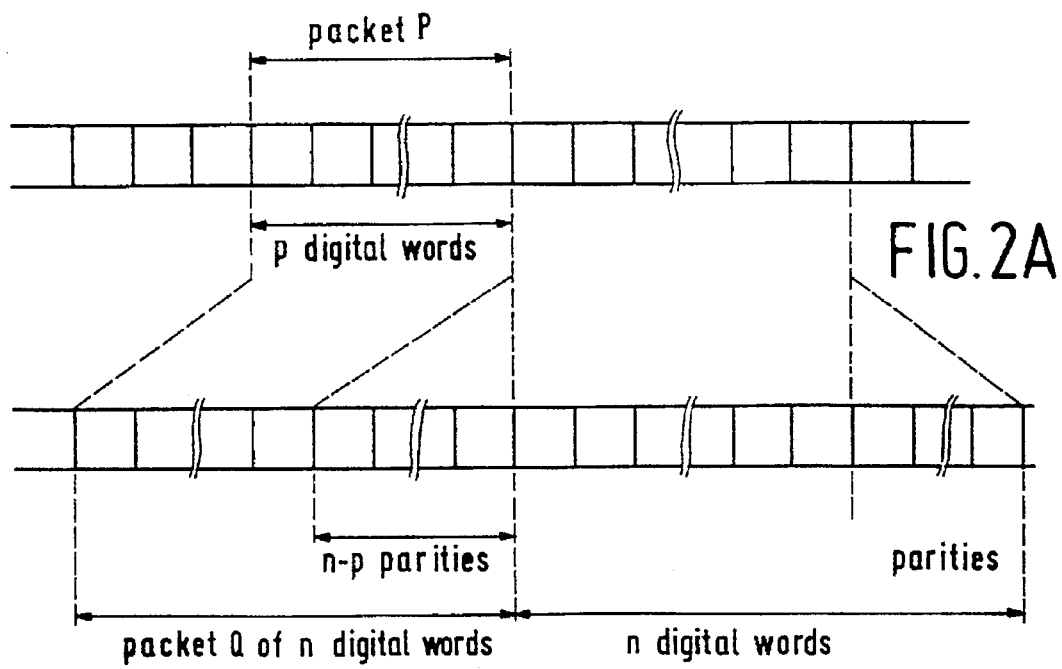
FIG.2A
FIG.2B

CONVERSION ARRANGEMENT FOR A MAGNETIC RECORDING/REPRODUCING APPARATUS OF THE D-TYPE

BACKGROUND OF THE INVENTION

1. Field of the Invention

The invention relates to an encoder arrangement for converting a digital data signal into a digital input signal which is suitable for receipt by a magnetic recording apparatus of the D-type, for recording the input signal in tracks on a magnetic record carrier, the magnetic recording apparatus of the D-type comprising first error correction encoding means for carrying out an error correction encoding on the digital input signal, first shuffling means for carrying out a data shuffling step on the digital input signal, channel encoding means for converting the digital input signal processed in the error correction encoding means and the shuffling means into a recording signal suitable for recording on the magnetic record carrier. The invention further relates to a decoder arrangement for a magnetic reproducing apparatus of the D-type. In addition, the invention relates to a magnetic recording apparatus of the D-type, provided with the encoder arrangement, and a magnetic reproducing apparatus of the D-type provided with the decoder arrangement.

A magnetic recording/reproducing apparatus of the D-type is a digital video tape recording/reproducing apparatus, as an example, a magnetic recording/reproducing apparatus of the D1-type. Other examples of magnetic recording/reproducing apparatuses of the D-type are, for example, recording/reproducing apparatuses of the D2-type, the D3-type or the D5-type.

2. Description of the Related Art

A magnetic recording/reproducing apparatus of the D1-type is also identified as a 4:2:2 component digital video recorder, and is extensively described in the book 'Introduction to the 4:2:2 digital video tape recorder', by S. Gregory, 1988 Pentech press, London. Further, the magnetic video recorder of the D1-type is the subject of the D1 standard of the EBU, given in the EBU technical document Tech. 3252-E of September 1986, which is also published in SMPTE Journal, March 1986, pp. 359 to 400.

The magnetic recording/reproducing apparatus described in the foregoing is intended for use as a recorder/reproducer for recording/reproducing a standard definition digital video signal having a net bit rate of substantially 166 Mb/s that is supplied to its input/output terminal.

SUMMARY OF THE INVENTION

The invention aims at providing solutions for recording a data signal which has a bit rate which is, at the maximum, equal to the bit rate of the standard definition video signal that is normally recorded on said recording apparatus, but further does not satisfy the requirements that are valid for the standard digital video signal applied to said magnetic recording apparatus of the D-type. The invention also aims at providing solutions for reproducing the data signal thus recorded on the magnetic record carrier.

To that purpose, the encoder arrangement in accordance with the invention is characterized in that the encoder arrangement comprises second error correction encoding means, having an input which is coupled to the input terminal of the encoder arrangement, and an output, for carrying out an error correction encoding step on packets of p m-bit digital words in the input signal received via its input, and for supplying error protection encoded packets of n m-bit digital words to its output, where n, m and p are integers larger than 1, and n>p, conversion means having an input and an output, for converting digital words comprised in the digital signal applied to its input into converted digital words so as to obtain a converted digital output signal, and for supplying the converted digital output signal to its output, the output being coupled to the output terminal of the encoder arrangement.

The data signal supplied to the encoder arrangement can, as an example, be a data compressed high definition digital video signal, which high definition digital video signal has, in uncompressed form, a net bit rate of substantially 664 Mb/s. In order to record this high definition digital video signal on a magnetic recorder of the D-type, it will be clear that a data reduction on the high definition video signal must be carried out, so as to bring the bit rate down to a value such that it has a bit rate which is sufficiently low for recording on the magnetic record carrier by means of the recording apparatus of the D-type.

However, as a result of this data compression carried out, the data reduced high definition video signal will not have the characteristics of the standard definition digital video signal that is normally supplied to the D-type magnetic video recorder. As a consequence, recording and reproduction on/from such a D-type magnetic video recorder is not well possible without a further data processing carded out on the data reduced high definition digital video signal.

As will become apparent later, this data processing in the encoder arrangement in accordance with the invention, will result in a slight increase in bit rate. As a consequence, the original data reduction carried out on the high definition digital video signal will be slightly higher than the factor of 4 (664/166), that one would normally expect. In an example, if the arrangement in accordance with the invention adds about 16 Mb/s to the data stream, a compression of a little bit more than 4 is needed so as to obtain a data compressed high definition video signal having a bit rate of about 150 Mb/s as input signal for the encoder arrangement.

In order to make the input data signal of the encoder arrangement suitable for recording by means of the D-type recording apparatus, a number of signal processing steps must be carried out on the input data signal. As has been said previously, the data reduced high definition video signal, which has the form of a data signal without much correlation between subsequent data words in the data stream, does not have the characteristics of the 'normal' standard definition video signal that is normally recorded on the D-type video recorder. As a result, the error correction encoding in the recording path in the recorder and the error correction decoding in the reproduction path in the reproducer fails to provide the required error correction on the recorded and reproduced data signal. Therefore, an additional error correction encoding step should be carried out on the data signal, prior to applying the signal to the D-type recorder, in order to enable an error correction to be carried out during reproduction, on the errors that may occur in the recording and reproducing step.

Further, there is a requirement on the input signal of the D-type recorder, in that some digital data words are inadmissible, so may not occur in the serial data stream of the input signal. Those digital data words are, in the example of a D1-type recorder, the 8-bit data words '00' (hex) and 'FF' (hex). In the data reduced high definition video signal, those data words however do occur. Therefore, the encoder arrangement comprises the conversion means, that converts the inadmissible data words into converted data words that are admissible.

The encoder arrangement may be further characterized in that the conversion means are adapted to convert the error correction encoded packets of n digital words, the conversion means comprising generator means for supplying a fixed auxiliary packet also having the length of n digital words, the conversion means further comprising calculation means for calculating, in a Galois field $GF(2^m)$, the formula $DW_i+\alpha.FW_i$, where $DW_i$ is the binary value corresponding to the i-th digital word in the packet and $FW_i$ is the fixed binary value corresponding to the i-th digital word in the fixed auxiliary packet, where i is an integer value running from 1 to n, the calculation means being further adapted to determine that value $\alpha_{def}$ for $\alpha$, for which, for all the digital words $DW_i$ in a packet, the Galois field $GF(2^m)$ calculation of $DW_i+\alpha_{def}FW_i$ results in converted digital words $CW_i$ unequal to the at least one inadmissible data word $DW_e$, the conversion means being further adapted to supply $\alpha_{def}$ together with the corresponding packet of converted digital words to its output. More specifically, the n-p fixed binary values $FW_{p+1}$ to $FW_n$ of the fixed auxiliary packet have been obtained by an error correction encoding step carried out on the following packet of p+1 binary values:

$$['1', FW_1, FW_2, \ldots, FW_p],$$

where '1' is the m-bit digital word denoting the decimal value '1'. By doing so, this provides an error correction on the value $\alpha_{def}$ transmitted, so that the value for $\alpha_{def}$ is less vulnerable to errors occurring during the recording and reproduction step.

Additionally, a shuffling step can be carried out in the encoder arrangement on the output signal of the conversion means, so as to enable a higher error correction capability for the data signal to be recorded and reproduced.

The encoder arrangement can be in the form of a separate unit, so that the D-type video recorder can be used, without altering the recorder. The encoder arrangement may however also be included in the D-type video recorder.

A decoder arrangement in accordance with the invention carries out a signal processing on the digital output signal of the reproducing apparatus of the D-type so as to regenerate a replica of the original digital data signal.

The decoder arrangement is characterized in that the decoder arrangement comprises second error correction decoding means having an input coupled to the input terminal of the decoder arrangement, and an output, for carrying out an error detection and correction on the digital signal applied to its input and for supplying an error corrected digital signal to its output, reconversion means having an input and an output, which output is coupled to the output terminal of the decoder arrangement, for reconverting digital words comprised in the digital signal applied to its input into reconverted digital words so as to obtain a reconverted digital output signal, and for supplying the reconverted digital output signal to its output.

In the case that the data has been shuffled in the encoder arrangement, a corresponding deshuffling step should be carded out in the decoder arrangement.

It should be noted that EP-A 570,214 discloses a magnetic recording/reproducing apparatus, for recording digital HD video signals in slant tracks on the record carrier, amongst others by increasing the number of tracks or by recording video information in the audio sectors of a track.

BRIEF DESCRIPTION OF THE DRAWINGS

These and other aspects of the invention will be further elucidated with reference to the embodiments given in the figures of the drawings, in which FIG. 1a shows an embodiment of the encoder arrangement and FIG. 1b an embodiment of the decoder arrangement;

FIG. 2a shows the data stream of the input data signal of the arrangement, and FIG. 2b shows the data stream of the output signal of the error correction encoding unit in the encoder arrangement;

DESCRIPTION OF THE PREFERRED EMBODIMENT

Figure 3:
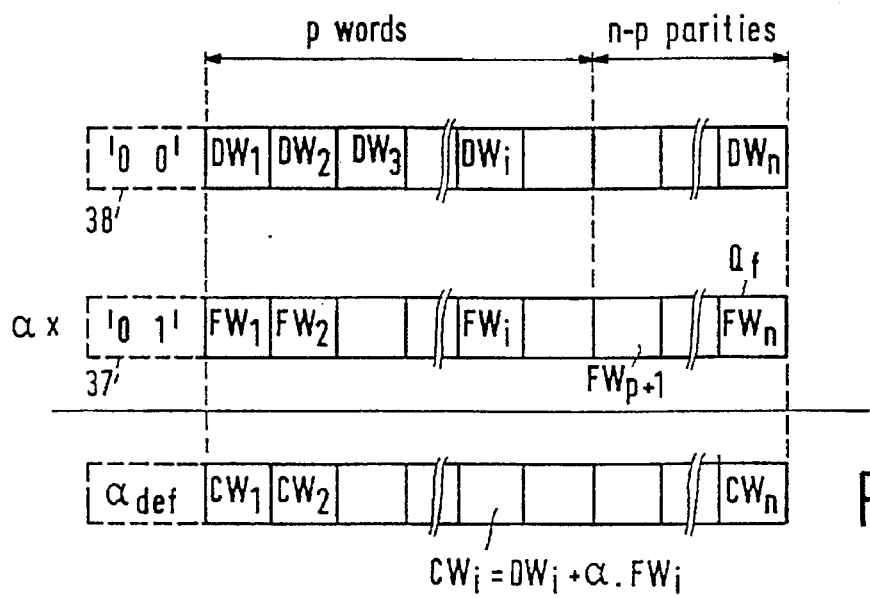
FIG. 3 shows the conversion as carried out in the converter unit in the encoding arrangement.

FIG. 1a shows, schematically and in block diagram an embodiment of the encoder arrangement 28. The encoder arrangement 28 has an input terminal 1 which is coupled to an input 2 of an error correction encoding unit 3, an output 4 of which is coupled to an input 5 of a converter 6. An output 7 of the converter 6 is coupled to an input 8 of a shuffling unit 9, an output 10 of which is coupled to the output terminal 11 of the encoder arrangement. The output terminal 11 is shown in FIG. 1a as being coupled to an input 23 of the magnetic recording apparatus of the D-type 24.

FIG. 1b shows, schematically and in block diagram, an embodiment of the decoder arrangement 30. The decoder arrangement 30 has an input terminal 12 which is coupled to an input 13 of a deshuffling unit 14, an output 15 of which is coupled to an input 16 of an error corrector 17. An output 18 of the error corrector 17 is coupled to an input 19 of a reconverter unit 20, an output 21 of which is coupled to the output terminal 22 of the decoder arrangement 30. The input terminal 12 is shown in FIG. 1b as being coupled to an output 25 of the magnetic reproducing apparatus 26 of the D-type.

Special attention should be paid to the sequence in which the units are serially arranged in the encoder arrangement 28 and the decoder arrangement 30. In order to realize an error correction step on the $\alpha_{def}$ values to be explained later, the reconverter unit 20 should be preceded by the error corrector 17, whereas the error correction encoder 3 precedes the converter 6.

The recording apparatus 24 and the reproducing apparatus 26 of the D-type, such as of the D1-type, are generally known in the art, see the references cited in the foregoing, that may be incorporated by reference.

As has been explained previously, a data reduced high definition digital video signal, which has a bit rate of about 150 Mb/s, is applied to the input terminal 1. In the error correction encoder 3, an error correction encoding is carried out on, each time, a packet P of p digital words (bytes), of 8 bit each. FIG. 2a shows the serial data stream of the 8-bit words applied to the input terminal 1. As a result of the error correction encoding, n-p parity bytes are added to the packet of bytes, so as to obtain subsequent packets Q of n digital words (bytes) of 8 bit each. This is shown in FIG. 2b. The serial data stream in FIG. 2b is shown on an expanded time scale. It should, however, be understood that the length of time of the packets Q in FIG. 2b is the same as the length of time of the packets P in FIG. 2a. Thus, an increase in bit rate has occurred in the output signal of the error correction encoder 3, because of the adding of the parity bytes.

The packets Q, generated by the encoder 3 are supplied to the converter 6. The converter 6 is needed, as the serial data stream of digital words supplied by the encoder 3 comprise data words that are inadmissible in the input data stream of the D-type recorder 24. That is: both the p digital words in a packet Q, as well as the n-p parity words in the packet can include inadmissible data words. Those inadmissible data words are the data words '00' and 'FF'. The converter 6 is therefore available for convening the inadmissible digital words into admissible digital words.

To that purpose, the converter 6 carries out a computation on the packets of n digital words, denoted $DW_1$ to $DW_n$, as will be explained with reference to FIG. 3. A fixed packet $Q_f$ of n fixed 8-bit digital words $FW_1$ to $FW_n$ is available. The fixed packet has been obtained as follows.

The p digital words $FW_1$ to $FW_p$ can be chosen more or less freely, as will be explained later. Next, the n-p digital words $FW_{p+1}$ to $FW_n$ are obtained by carrying out the same error correction encoding on the following packet of words

['01'(hex),$FW_1$,$FW_2$, ... ,$FW_p$]

as has been carried out in the error correction encoder 3 on the packets P. FIG. 3 shows this packet of words in the center line, where the block 37 given in broken lines indicates the digital word '01' (hex) that has been added fictitiously in front of the packet of words $FW_1$ to $FW_p$.

It should be noted here that calculating the parity words $FW_{p+1}$ to $FW_n$ using the packet of words ['01'(hex),$FW_1$, . . . , $FW_p$], results in different parity words $FW_{p+1}$ to $FW_n$ than if the parity words would have been calculated using the packet of words [$FW_1$, . . . ,$FW_p$].

It should further be noted that, because of the linearity of the processing in the encoder 3, carrying out an error correction encoding in the encoder 3 on the packet P [$DW_1$, . . . ,$DW_p$] having p digital words, results in the same n-p parity words, as if the same error correction encoding would have been carried out on a packet P', being the packet P and having one additional digital word '00' (hex) added in front of the packet P, that is the packet ['00'(hex),$DW_1$, . . . , $DW_p$]. This packet is shown in FIG. 3, the top line, where the block 38 given in broken lines indicates the added word '00' (hex).

Adding the digital word '01' (hex) to the p digital words $FW_1$ to $FW_p$ for calculating the parity words $FW_{p+1}$ to $FW_n$ in the fixed packet $Q_f$, results in the fact that, as will be explained later, the value $\alpha_{def}$ has been error correction encoded, so that an error correction step can be applied during reproduction on $\alpha_{def}$.

With the fixed packet $Q_f$ so obtained, corresponding words $DW_i$ and $FW_i$ of the packets Q and $Q_f$ are added in conformity with the following formula, so as to obtain converted digital words $CW_i$:

$DW_i + \alpha.FW_i = CW_i$, where $\alpha$ is a constant. Calculations are carried out in the Galois field $GF(2^m)$, where m=8 in the present case. Otherwise said, calculations are carried out on $DW_i$ and $FW_i$, where the values for $DW_i$ and $FW_i$ are elements of a closed set of values, and where the resulting values $CW_i$ of the calculation are elements from the same closed set of values. As a result, the words $CW_i$ are again 8-bit digital words, just as the words $DW_i$ and $FW_i$ (in the present example). Reference is made in this respect to the book 'Introduction to the 4:2:2 digital video tape recorder', more specifically, Appendix A in that book on p. 172 to 189.

As a general statement, it can be said that the fixed words $FW_i$ can not have the value '00', as, for the case that the corresponding digital word is '00' or 'FF', the resulting converted words $CW_i$ equal '00'. On the other hand, if it is known that some specific digital words $DW_i$ are (by definition) unequal to '00' and 'FF', the corresponding fixed digital words $FW_i$ can be chosen to be equal to '00'.

The algorithm carried out in the converter 6 is such that for i=1, the converted word $CW_1$ is calculated, and it is determined for which values of $\alpha$ the converted word $CW_1$ equals one of the inadmissible data words '00' or 'FF'. Those values for $\alpha$ are considered as inadmissible. Next, the procedure is repeated for i=2. Again, it is determined which of the remaining values of $\alpha$ result in inadmissible converted words. Those values for $\alpha$ are also deleted. The procedure is again repeated for i=3. Again, it is determined which of the remaining values of $\alpha$ result in inadmissible converted words, which values are consequently also deleted. This procedure is repeated until all the words $DW_i$ have been processed in this way. After termination, one or more values of $\alpha$ remain. One of them ($\alpha_{def}$) is used to carry out the computation $DW_i + \alpha_{def}.FW_i = CW_i$.

Figure 4:
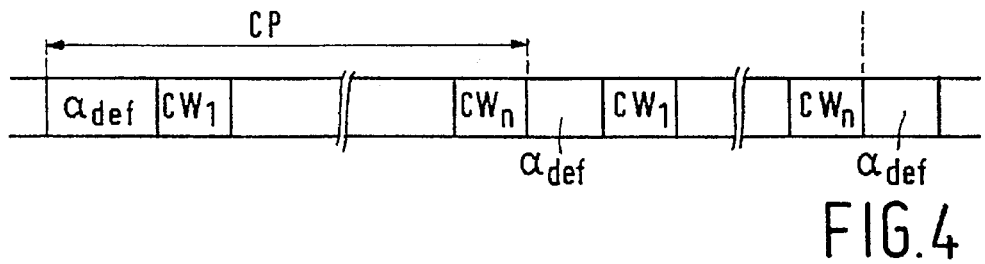
FIG. 4 shows the data stream of the output signal of the converter unit in the encoder arrangement.

The packet thus processed is supplied to the output 7, together with the value $\alpha_{def}$. This is shown in FIG. 3, where the value $\alpha_{def}$ is added in front of the packet of converted data words $CW_1$ to $CW_n$, that are supplied to the output 7. This process is repeated for subsequent packets. As a result, the serial data stream as shown in FIG. 4 is obtained.

The calculation explained above with reference to FIG. 3, can be interpreted in a different way, namely in that the following calculation is carried out:

['00'(hex),$DW_1$, . . . ,$DW_n$] + $\alpha_{def}$ · ['01'(hex),$FW_1$, . . . ,$FW_n$] =

[$\alpha_{def}$(hex),$CW_1$, . . . ,$CW_n$].

As none of the data words in the packets CP are allowed to be equal to '00'(hex) or 'FF'(hex), also $\alpha_{def}$ can not be equal to '00'(hex) or 'FF'(hex). This means that, when starting the calculation for determining those values for $\alpha$ that are admissible, the values '00'(hex) and 'FF'(hex) can already be deleted from the available group of values for $\alpha$.

It will be understood that sufficient values for $\alpha$ must be present in order to have at least one value for $\alpha$ left at the end of the computation carried out on the bytes in a packet Q. With an 8-bit digital word for $\alpha$, this means that n can be equal to 127 at maximum, nl. ($2^8$−2)/2. Further, as has been said previously, if one or more of the digital words $DW_i$ are known to be unequal to '00' and 'FF', one can choose the corresponding fixed word $CW_i$ equal to '00'. Consequently, for this (these) value(s) for i, no inadmissible value for $\alpha$ will result, and thus can n be chosen larger.

The serial output data stream of the converter 6 comprises converted packets CP, comprising n 8-bit converted digital words, preceded by a value $\alpha_{def}$ for the corresponding value of $\alpha$.

The serial data stream thus obtained is supplied to a shuffling unit 9, in which the data stream is shuffled.

It should be noted that, in order to error correct $\alpha_{def}$, one could have tried to carried out an error correction encoding after the converter 6. This would, however, have led to the generation of parity words that would violate the '00'(hex)- and 'FF'(hex)- constraint. Therefore, the error correction encoding is carried out prior to conversion in the converter 6. However, in the way as explained above in which the fixed packet $Q_f$ has been derived, this has led to a data stream that is error corrected, inclusive the words $\alpha_{def}$.

Figure 5:
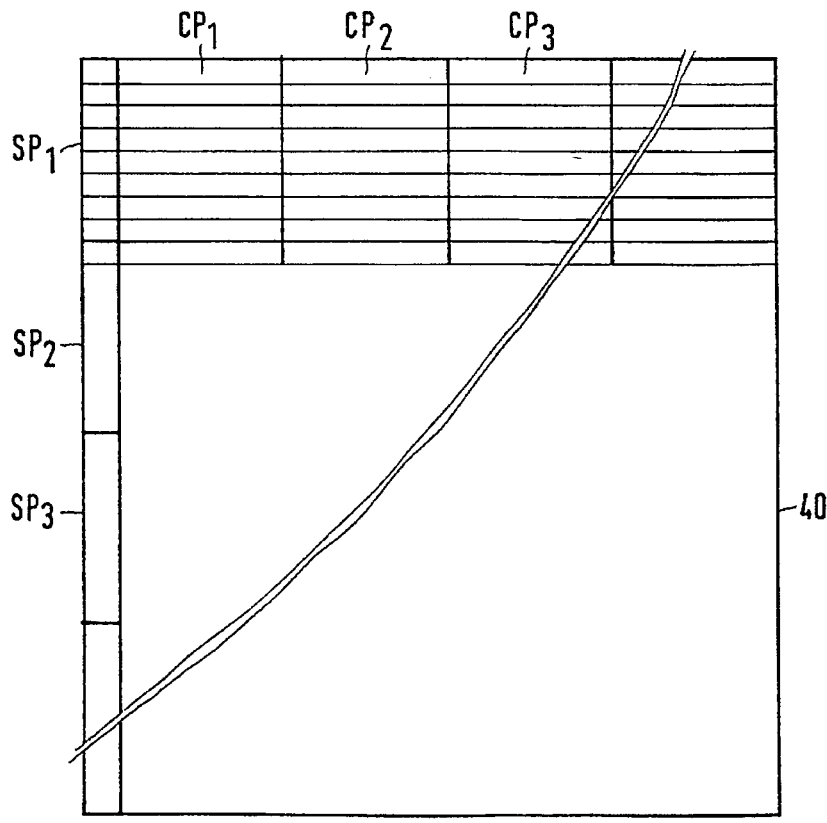
FIG. 5 shows an embodiment of the shuffling unit in the encoder arrangement.

FIG. 5 shows a way in which the converted serial data stream can be shuffled. FIG. 5 shows a memory 40, which is comprised in the shuffling unit 9, in which memory the converted packets $CP_1$, $CP_2$, $CP_3$, and so on, of the output signal of the converter 6 are stored in a line-wise direction. The information stored in the memory 40 is subsequently read out in a row-wise direction. As a result, packets $SP_1$, $SP_2$, $SP_3$, and so on, of shuffled data are read out to form a serial data stream, which is supplied to the output 10. The serial data stream thus obtained is supplied to the D-type recorder 24 and can be recorded on the magnetic record carrier (not shown).

The shuffling can be done in a different way. As another example, the serial data stream of converted packets can be stored in a row-wise direction, and can be read out in a line-wise direction.

A further shuffling step can be carried out. One possibility is that, during a linewise read-out of the data from the memory 40, a shuffling is carried out on the data stored in a line, or in that during a row-wise read-out, a shuffling is carried out on the data stored in a row. Another possibility is that during the line-wise read-in of the data into the memory 40, a shuffling is carried out on the data to be stored in a line, or in that during a row-wise read-in, a shuffling is carried out on the data to be stored in a row.

It should further be noted that there is no need for the memory 40 to have a width or height such that an integer number of packets CP can be stored in a line (or row).

Figure 6:
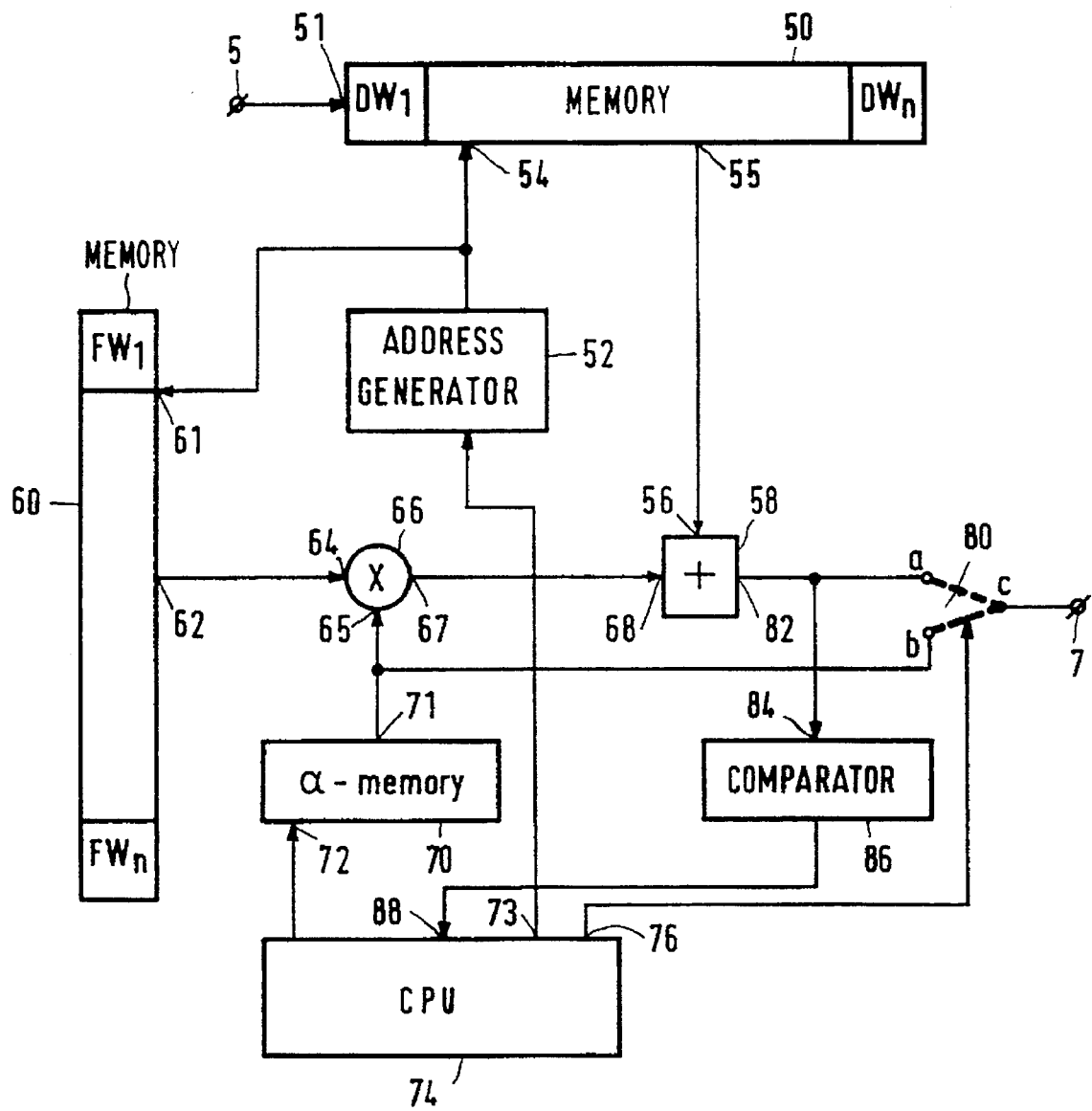
FIG. 6 shows an embodiment of the converter unit in the encoder arrangement.

FIG. 6 shows an embodiment of the converter 6. The converter 6 comprises a memory 50 having an input 51 coupled to the input terminal 5. A packet Q of n digital words $DW_1$ to $DW_n$ can be stored in the memory 50 under the influence of addresses supplied by an address generator 52 to an address input 54. An output 55 of the memory 50 is coupled to an input 56 of an adder unit 58. The converter further comprises a memory 60 in which the fixed packet $Q_f$ of words $FW_1$ to $FW_n$ is stored. Addresses generated by the address generator 52 are also supplied to an address input 61 of the memory 60. An output 62 of the memory 60 is coupled to an input 64 of a multiplier 66, an output 67 of which is coupled to an input 68 of the adder unit 58. A further memory 70 in which the values for $\alpha$ are stored is available, an output 71 is coupled to an input 65 of the multiplier 66. As has been explained previously, the memory 70 does not comprise the values '00'(hex) or 'FF'(hex).

Address signals are supplied to an address input 72 by a central processing unit 74. A control signal is supplied by the CPU 74 via an output 73 to the address generator 52, in order for the address generator 52 to supply subsequent addresses for the memories 50 and 60. A further control signal is supplied by the CPU 74 for a controllable switch 80, which has a first terminal a coupled to an output 82 of the adder unit 58, a second terminal b coupled to the output 71 of the memory 70 and a terminal c coupled to the output 7 of the converter. The output 82 of the adder unit 58 is further coupled an input 84 of a comparator 86, an output of which is coupled to a control input 88 of the CPU 74.

It is assumed that a packet Q has been stored in the memory 50. The procedure starts in that an address is generated by the address generator 52 under the influence of a control signal from the CPU 74, so that the first memory locations in the memories 50 and 60 are addressed. The first digital word $DW_1$ and the first fixed word $FW_1$ are supplied to the outputs 55 and 62, respectively. Under the influence of a control signal from the CPU 74 applied to the control signal input 72, the memory 70 supplies a first value for $\alpha$ to its output 71. At the output 67, the value $\alpha.FW_1$ is now available, so that the value $DW_1+\alpha.FW_1$ is supplied to the input 84 of the comparator 86. This value is compared to '00' and 'FF'. If there is no equality, the comparator 86 generates a first detection signal, and if an equality with one of the two inadmissible words has been determined, a second detection signal is generated and supplied to the input 88 of the CPU 74. Then, the next value for $\alpha$ is generated and again, the comparator compares $DW_1+\alpha.FW_1$ with '00' and 'FF'. This is repeated for all available values for $\alpha$. CPU deletes those values for $\alpha$ from further use, for which the comparator 86 has detected an equality with '00' or 'FF'.

Next, the following address is generated by the address generator 52 under the influence of a control signal from the CPU 74, so that the second memory locations in the memories 50 and 60 are addressed. The second digital word $DW_2$ and the second fixed word $FW_2$ are supplied to the outputs 55 and 62, respectively. Under the influence of a control signal from the CPU 74 applied to the control signal input 72, the memory 70 supplies the first remaining value for $\alpha$ to its output 71. Now the value $DW_2+\alpha.FW_2$ is supplied to the input 84 of the comparator 86. This value is compared to '00' and 'FF'. If there is no equality, the comparator 86 generates a first detection signal, and if an equality with one of the two inadmissible words has been determined, a second detection signal is generated and supplied to the input 88 of the CPU 74. Then, the next remaining value for $\alpha$ is generated and again, the comparator compares $DW_2+\alpha.FW_2$ with '00' and 'FF'. This is repeated for all remaining values for $\alpha$. CPU again deletes those values for $\alpha$ from further use, for which the comparator 86 has detected an equality with '00' or 'FF'. This is repeated for all n words in the memory 50. A number of possible values for at have been deleted in the above procedure, but not all of them. If there are more than one left, one of the remaining values for $\alpha$ is now chosen by the CPU 74 as $\alpha_{def}$. The value for $\alpha_{def}$ chosen can, as an example, be the first value for $\alpha$ still present in the memory 70. The CPU 74 now generates such a control signal to the memory 70 that $\alpha_{def}$ is supplied to the input 65 of the multiplier 66.

A control signal is supplied by the CPU 74, via its output 76 to the switch 80, so that this switch 80 takes the position b-c. The value $\alpha_{def}$(hex) is supplied to the output 7. Next, the switch is set to the position a-c. Now the sequence of addresses is repeated so that all the words $DW_1$ to $DW_n$ are supplied to the output 55 and all the fixed words $FW_1$ to $FW_n$ are supplied to the output 62, so that the converted words $CW_i$ can be subsequently supplied to the output 7.

It will be clear that instead of a memory 70, the converter 6 could comprise a counter for generating the subsequent values for $\alpha$.

The decoder arrangement given in FIG. 1b will now be further discussed.

Deshuffling in the deshuffling unit 14 means that a memory, as shown in FIG. 5 is present. If during shuffling, the memory was filled in a line-wise direction and read out in a row-wise direction, the deshuffling takes place by filling the memory in a row-wise direction and reading out the memory in a line-wise direction.

Error detection and error correction in the corrector 17 is carried out each time on a packet CP. This packet includes n+1 data words, where the first data word is the value $\alpha_{def}$, which is followed by p words $CW_1, CW_2, \ldots, CW_p$. Those words are followed by the words $CW_{p+1}$ to $CW_n$ that act as parity words. An error correction step can thus be carried out on the p+1 words $\alpha_{def}$ and $CW_1$ to $CW_p$. Thus, if the value for $\alpha_{def}$ appears the be incorrect, it can be corrected by the correction decoder 17. In this way, the packet CP supplied to the input 16 can be corrected so as to obtain a corrected packet CP' at the output 18.

Figure 7:
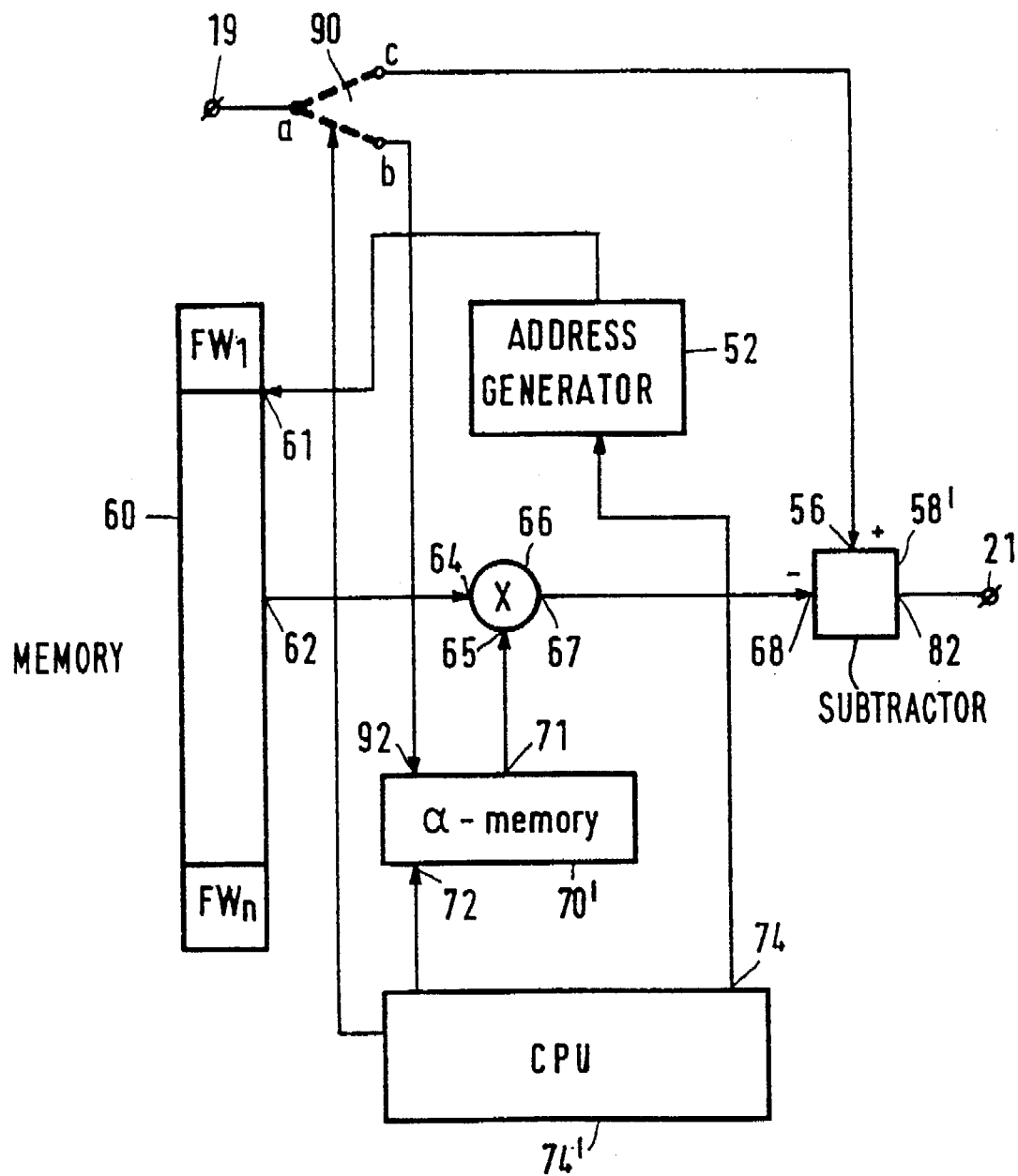
FIG. 7 shows an embodiment of the reconverter unit in the decoder arrangement.

An embodiment of the reconverter unit 20 is shown in FIG. 7. The reconverter unit 20 looks a little bit like the converter of FIG. 6, and comprises memories 60 and 70', address generator 52, multiplier 66 and a subtractor unit 58' instead of the adder 58. The memory 60 has the same n fixed data words $FW_1$ to $FW_n$ stored as the memory 60 in FIG. 6. A controllable switch 90 is present, a first terminal a of which is coupled to the input 19 of the reconverter unit, a second terminal b of which is coupled to the input 92 of the memory 70', and a third terminal c of which is coupled to an input 56 of the subtractor unit 58'. The memory 70' is for storing one value for $\alpha_{def}$.

Upon receiving a corrected packet CP', the CPU 74' generates a control signal for the switch 90, so that it is set in the position a-b. The value for $\alpha_{def}$ can now be loaded in the memory 70' under the influence of a control signal supplied by the CPU 74' to the input 72. Under the influence of a second control signal, the switch 90 is placed in the position a-c, so that the subsequent data words $CW_i$ are supplied to the subtractor 58'. Under the influence of a control signal to the address generator 52, addresses are generated and supplied to the memory 60, so that the fixed data words $FW_i$ are subsequently applied to the multiplier 66.

The reconverter unit 20 thus carries out the following calculation in the previously described Galois field $GF(2^m)$:

$$RW_i = CW_i - \alpha_{def} FW_i.$$

As a result, reconverted data words $RW_i$ that are equal to the original data words $DW_i$ occur at the output 21.

As a result, a replica of the original data signal, as applied to the input 1 of the arrangement 28, is obtained at the output 22 of the arrangement 30.

It should be noted that the determination of the value for $\alpha$ can also be based on other constraints to be posed on the converted data stream.

In a further embodiment, it is possible to carry out a more complex conversion in the conversion unit 6, such as calculating the converted words by means of the equation:

$$CW_i = DW_i + \alpha.FW_i + \beta.GW_i.$$

Now, two fixed packets $FW_i$ and $GW_i$ are present, and a value for $\alpha_{def}$ and $\beta_{def}$ are calculated so as to enable a conversion in accordance with the above formula. Adding one or more terms, such as the β-term, results in more freedom of converting the digital data words such that also other constraints can be satisfied.

An encoder arrangement for adapting a data signal for recording of the data signal on a D-type magnetic recording apparatus has been proposed. The arrangement comprises an error correction encoding unit (3), a converter unit (6) and a shuffling unit (9). A decoder arrangement (30) for reconverting the signal obtained after reproduction from a D-type reproduction apparatus has also been proposed. It comprises a deshuffling unit (14), an error correction decoding unit (17) and a reconverter unit (20).

We claim:

1. An encoder arrangement for converting a digital data signal into a digital input signal which is suitable for being received by a digital video (D-type) magnetic recording apparatus for recording the digital input signal in tracks on a magnetic record carrier, the magnetic recording apparatus of the D-type comprising:

first error correction encoding means for carrying out an error correction encoding on the digital input signal;

first shuffling means for carrying out a data shuffling step on the digital input signal; and channel encoding means for converting the digital input signal, after being processed in the error correction encoding means and the shuffling means, into a recording signal suitable for recording on the magnetic record carrier, characterized in that the encodes arrangement comprises:

second error correction encoding means, having an input coupled to an input terminal of the encoder arrangement, and an output, for carrying out an error correction encoding step on packets of p m-bit digital words in the digital data signal applied to said input terminal, and for supplying error correction encoded packets of n m-bit digital words to said output, where n, m and p are integers larger than 1, and n>p;

conversion means, having an input and an output, for converting digital words contained in the digital signal applied to said input into converted digital words so as to obtain a converted digital output signal, and for supplying the converted digital output signal to said output; and second shuffling means having an input coupled to the output of the conversion means and an output coupled to the output terminal of the encoder arrangement for carrying out a shuffling step on digital words contained in the converted digital output signal of the conversion means so as to obtain the digital input signal for the D-type recording apparatus.

2. An encoder arrangement as claimed in claim 1, characterized in that the output of the second error correction encoding means is coupled to the input of the conversion means.

3. A digital video (D-type) magnetic recording apparatus, comprising an encoder arrangement as claimed in claim 1.

4. An encoder arrangement as claimed in claim 1, characterized in that the conversion means converts digital words contained in the digital signal supplied to said input that are equal to an inadmissible digital word $DW_e$ for the D-type recording apparatus, into converted digital words that are admissible for the D-type recording apparatus.

5. An encoder arrangement as claimed in claim 4, wherein the conversion means converts digital words contained in the digital signal applied to said input that are equal to an inadmissible digital word $DW_e$ for the D-type recording apparatus, into converted digital words that are admissible for the D-type recording apparatus, characterized in that the conversion means converts the error correction encoded packets of n digital words, the conversion means comprising:

generator means for supplying a first and a second fixed auxiliary packet also having a length of n digital words; and calculation means for calculating, in a Galois field $GF(2^m)$, the formula $DW_i + \alpha.FW_i + \beta.GW_i$, where $DW_i$ is the binary value corresponding to the i-the digital word in the packet, $FW_i$ is the fixed binary value corresponding to the i-the digital word in the first fixed auxiliary packet, and $GW_i$ is the fixed binary value corresponding to the i-the digital word in the second fixed auxiliary packet, where i is an integer value running from 1 to n, the calculation means further determining that value $\alpha_{def}$ for $\alpha$ and $\beta_{def}$ for $\beta$, for which, for all the digital words $DW_i$ in a packet, the Galois field $GF(2^m)$ calculation of $DW_i + \alpha_{def} FW_i + \beta_{def} GW_i$ results in converted digital words $CW_i$ unequal to the at least one inadmissible data word $DW_e$, the conversion means further supplying $\alpha_{def}$ and $\beta_{def}$ together with the corresponding packet of converted digital words to said output.

6. An encoder arrangement as claimed in claim 1, characterized in that the converted digital output signal is supplied to the second shuffling means in the form of subsequent blocks of data, the second shuffling means carrying out a shuffling step on a block of data of the converted digital output signal.

7. An encoder arrangement as claimed in claim 6, characterized in that the second shuffling means comprises two-dimensional memory means having two orthogonal axes for storing a block of data of the converted digital output signal in a first one of the two orthogonal axes of the two-dimensional memory means, and for reading out the block of data in a second one of the two orthogonal axes of the two-dimensional memory means.

8. An encoder arrangement as claimed in claim 7, characterized in that, the second shuffling means further carries out a further shuffling step on the data stored in the second one of the two orthogonal axes of the two-dimensional memory means, before outputting the data to said output.

9. An encoder arrangement as claimed in claim 7, characterized in that the second shuffling means further carries out a further shuffling step on the data to be stored in the first one of the two orthogonal axes of said two-dimensional memory means.

10. A decoder arrangement for converting a digital output signal from a digital video (D-type) magnetic reproducing apparatus into a digital data signal, the magnetic reproducing apparatus of the D-type comprising:

channel decoding means for converting a signal read from the record carrier into a channel decoding signal;

first deshuffling means for carrying out a data deshuffling step on a signal applied to its input; and first error correction decoding means for carrying out an error detection and correction on the signal applied to an input of the first error correction decoding means, characterized in that the decoder arrangement comprises:

second error correction decoding means, having an input coupled to an input terminal of the decoder arrangement, and an output, for carrying out an error detection and correction on a digital signal applied to said input and for supplying an error corrected digital signal to said output; and reconversion means, having an input and an output, said output being coupled to an output terminal of the decoder arrangement, for reconverting digital words contained in a digital signal applied to said input into reconverted digital words so as to obtain a reconverted digital output signal, and for supplying the reconverted digital output signal to said output, wherein the output of the second error correction decoding means is coupled to the input of the reconversion means, the reconverted digital output signal being the digital data signal available at the output terminal of the decoder arrangement.

11. A decoder arrangement as claimed in claim 10, characterized in that the reconversion means reconverts packets of digital words, each packet comprising n m-bit digital words, where n and m are integers larger than 1, the reconversion means comprising:

retrieval means for retrieving a value $\alpha$ and a value $\beta$, one value for $\alpha$ and one value for $\beta$ for each of the packets, from information applied to the input of the reconversion means;

generator means for supplying a first and a second fixed auxiliary packet also having a length of n digital words; and calculation means for calculating, in a Galois field $GF(2^m)$, the formula $CW_i - \alpha.FW_i - \beta GW_i$, where $CW_i$ is the binary value corresponding to the i-the digital word in the packet, $FW_i$ is the fixed binary value corresponding to the i-the digital word in the first fixed auxiliary packet, and $GW_i$ is the fixed binary value corresponding to the i-the digital word in the second fixed auxiliary packet, where i is an integer value running from 1 to n.

12. A digital video (D-type) magnetic reproducing apparatus, comprising a decoder arrangement as claimed in claim 10.

13. A decoder arrangement for converting a digital output signal from a digital video (D-type) magnetic reproducing apparatus into a digital data signal, the magnetic reproducing apparatus of the D-type comprising:

channel decoding means for converting a signal read from the record carrier into a channel decoding signal;

first deshuffling means for carrying out a data deshuffling step on a signal applied to an input of the first deshuffling means; and first error correction decoding means for carrying out an error detection and correction on a signal applied to an input of said first error correction decoding means, characterized in that the decoder arrangement comprises:

second error correction decoding means, having an input coupled to an input terminal of the decoder arrangement, and an output, for carrying out an error detection and correction on the digital output signal applied to the input terminal, and for supplying an error corrected digital signal to said output; and reconversion means, having an input and an output, said output being coupled to an output terminal of the decoder arrangement, for reconverting digital words contained in a digital signal applied to said input into reconverted digital words so as to obtain a reconverted digital output signal, and for supplying the reconverted digital output signal to said output, wherein the reconversion means reconverts packets of digital words, each packet comprising n m-bit digital words, where n and m are integers larger than 1, the reconversion means comprising:

retrieval means for retrieving a value $\alpha$, one $\alpha$ for each of the packets, from information applied to the input of the reconversion means;

generator means for supplying a fixed auxiliary packet also having a length of n digital words; and calculation means for calculating, in a Galois field $GF(_2m)$, reconverted words in accordance with the formula $CW_i - \alpha.FW_i$, where $CW_i$ is the binary value corresponding to the i-the digital word in the packet, and $FW_i$ is the fixed binary value corresponding to the i-the digital word in the fixed auxiliary packet, where i is an integer value running from 1 to n.

14. A decoder arrangement as claimed in claim 13, characterized in that the fixed auxiliary packet comprising the n digital words $FW_i$ equals the fixed auxiliary packet of an encoder arrangement which includes conversion means for converting digital words in an input signal that are equal to an inadmissible digital word $DW_e$ for the D-type recording apparatus, into converted digital words that are admissible for the D-type recording apparatus, wherein the conversion means converts error correction encoded packets of n digital words, the conversion means comprising:

generator means for supplying the fixed auxiliary packet also having the length of n digital words; and calculation means for calculating, in a Galois field $GF(2^m)$, the formula $DW_i + \alpha . FW_i$, where $DW_i$ is the binary value corresponding to the i-the digital word in the packet, and $FW_i$ is the fixed binary value corresponding to the i-the digital word in the fixed auxiliary packet, where i is an integer value running from 1 to n, the calculation means further determining that value $\alpha_{def}$ for $\alpha$, for which, for all the digital words $DW_i$ in a packet, the Galois field $GF(2^m)$ calculation of $DW_i + \alpha_{def} . FW_i$ results in converted digital words $CW_i$ unequal to the at least one inadmissible data word $DW_e$, the conversion means further supplying $\alpha_{def}$ together with the corresponding packet of converted digital words to the output of the conversion means.

15. A digital video (D-type) magnetic reproducing apparatus, comprising a decoder arrangement as claimed in claim 13.

16. A decoder arrangement for converting a digital output signal from a digital video (D-type) magnetic reproducing apparatus into a digital data signal, the magnetic reproducing apparatus of the D-type comprising:

channel decoding means for converting a signal read from the record carrier into a channel decoding signal;

first deshuffling means for carrying out a data deshuffling step on a signal applied to an input of the first deshuffling means; and first error correction decoding means for carrying out an error detection and correction on a signal applied to an input of the first error correction decoding means, characterized in that the decoder arrangement comprises:

second error correction decoding means, having an input coupled to an input terminal of the decoder arrangement, and an output, for carrying out an error detection and correction on the digital output signal applied to said input terminal, and for supplying an error corrected digital signal to said output; and reconversion means, having an input and an output, said output being coupled to an output terminal of the decoder arrangement, for reconverting digital words contained in the digital signal applied to said input, into reconverted digital words so as to obtain a reconverted digital output signal, and for supplying the reconverted digital output signal to said output, wherein said decoder arrangement further comprises:

second deshuffling means, having an input coupled to the input terminal of the decoder arrangement, and an output coupled to the input of the second error correction decoding means, for carrying out a deshuffling step on digital words contained in the digital output signal of the D-type reproduction apparatus.

17. A digital video (D-type) magnetic reproducing apparatus, comprising a decoder arrangement as claimed in claim 16.

18. A decoder arrangement as claimed in claim 16, characterized in that the digital output signal is supplied to the second deshuffling means in the form of subsequent blocks of data, the second deshuffling means carrying out a deshuffling step on a block of data of the digital output signal.

19. A decoder arrangement as claimed in claim 18, characterized in that the second deshuffling means comprise a two-dimensional memory means having two orthogonal axes for storing a block of data of the digital output signal in a second one of the two orthogonal axes of the two-dimensional memory means, and for reading out the block of data in a first one of the two orthogonal axes of the two-dimensional memory means.

20. A decoder arrangement as claimed in claim 19, characterized in that the second deshuffling means further carries out a further deshuffling step on the data store in the first one of the two orthogonal axes of the two-dimensional memory means, before outputting the data to said output.

21. A decoder arrangement as claimed in claim 19, characterized in that the second deshuffling means further carries out a further deshuffling step on the data to be stored in the second one of the two orthogonal axes of the two-dimensional memory means.

22. An encoder arrangement for converting a digital data signal into a digital input signal which is suitable for being received by a digital video (D-type) magnetic recording apparatus for recording the digital input signal in tracks on a magnetic record carrier, the magnetic recording apparatus of the D-type comprising:

first error correction encoding means for carrying out an error correction encoding on the digital input signal;

first shuffling means for carrying out a data shuffling step on the digital input signal; and channel encoding means for converting the digital input signal, after being processed in the error correction encoding means and the shuffling means, into a recording signal suitable for recording on the magnetic record carrier, characterized in that the encoding arrangement comprises:

second error correction encoding means, having an input coupled to an input terminal of the encoder arrangement, and an output, for carrying out an error correction encoding step on packets of p m-bit digital words in the digital data signal received applied to said input terminal, and for supplying error correction encoded packets of n m-bit digital words to said output, where n, m and p are integers larger than 1, and n>p; and conversion means, having an input and an output, for converting digital words contained in the digital signal applied to said input into converted digital words so as to obtain a converted digital output signal, and for supplying the converted digital output signal to said output, said output being coupled to an output terminal of the encoder arrangement, wherein said conversion means converts digital words in the digital signal applied to said input that are equal to an inadmissible digital word $DW_e$ for the D-type recording apparatus, into converted digital words that are admissible for the D-type recording apparatus, characterized in that the conversion means converts the error protection encoded packets of n digital words, the conversion means comprising:

generator means for supplying a fixed auxiliary packet also having a length of n digital words; and calculation means for calculating, in a Galois field $GF(2^m)$, the formula $DW_i + \alpha . FW_i$, where $DW_i$ is the binary value corresponding to the i-the digital word in the packet, and $FW_i$ is the fixed binary value corresponding to the i-the digital word in the fixed auxiliary packet, where i is an integer value running from 1 to n, the calculation means further determining that value $\alpha_{def}$ for $\alpha$, for which, for all the digital words $DW_i$ in a packet, the Galois field $GF(2^m)$ calculation of $DW_i + \alpha_{def}FW_i$ results in converted digital words $CW_i$ unequal to the at least one inadmissible data word $DW_e$, the conversion means further supplying $\alpha_{def}$ together with the corresponding packet of converted digital words to said output.

23. An encoder arrangement as claimed in claim 22, characterized in that the output of the second error correction encoding means is coupled to the input of the conversion means.

24. A digital video (D-type) magnetic recording apparatus, comprising an encoder arrangement as claimed in claim 22.

25. An encoder arrangement as claimed in claim 22, characterized in that the n-p fixed binary values $FW_{p+1}$ to $FW_n$ of the fixed auxiliary packet have been obtained by an error correction encoding step carried out on the following packet of p+1 binary values:

$$\{'1', FW_1, FW_2, \ldots, FW_p\},$$

where '1' is the m-bit digital word denoting the decimal value '1'.

26. An encoder arrangement as claimed in claim 25, characterized in that the conversion means supplies converted packets of n+1 digital words in the following form:

$$\{\alpha_{def}, CW_1, CW_2, \ldots, CW_p, CW_{p+1}, \ldots, CW_n\}.$$

27. An encoder arrangement as claimed in claim 22, characterized in that the conversion means converts digital words in the digital signal applied to said input that are equal to an inadmissible digital word $DW_e$ for the D-type recording apparatus, into converted digital words that are admissible for the D-type recording apparatus.

28. An encoder arrangement as claimed in claim 27, wherein the conversion means converts digital words in the digital signal applied to said input that are equal to an inadmissible digital word $DW_e$ for the D-type recording apparatus, into converted digital words that are admissible for the D-type recording apparatus, characterized in that the conversion means converts the error correction encoded packets of n digital words, the conversion means comprising:

generator means for supplying a first and a second fixed auxiliary packet also having the length of n digital words; and calculation means for calculating, in a Galois field $GF(2^m)$, the formula $DW_i + \alpha.FW_i + \beta.GW_i$, where $DW_i$ is the binary value corresponding to the i-the digital word in the packet, $FW_i$ is the fixed binary value corresponding to the i-the digital word in the first fixed auxiliary packet, and $GW_i$ is the fixed binary value corresponding to the i-the digital word in the second fixed auxiliary packet, where i is an integer value running from 1 to n, the calculation means further determining that value $\alpha_{def}$ for $\alpha$ and $\beta_{def}$ for $\beta$, for which, for all the digital words $DW_i$ in a packet, the Galois field $GF(2^m)$ calculation of $DW_i + \alpha_{def}FW_i + \beta_{def}GW_i$ results in converted digital words $CW_i$ unequal to the at least one inadmissible data word $DW_e$, the conversion means further supplying $\alpha_{def}$ and $\beta_{def}$ together with the corresponding packet of converted digital words to said output.

* * * * *